June 2, 1970   D. B. GREEN   3,515,316
ACTUATOR FOR AEROSOL VALVES
Filed Feb. 21, 1968   4 Sheets-Sheet 1
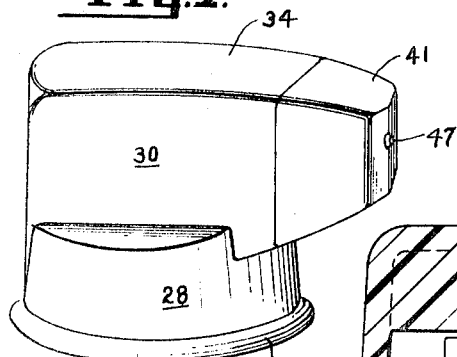
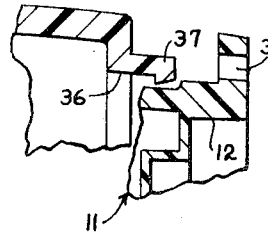
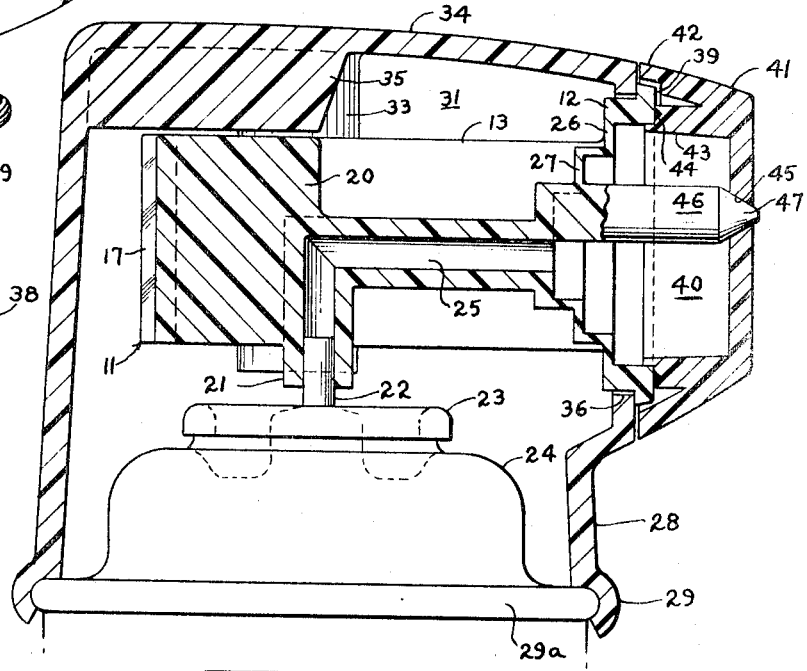
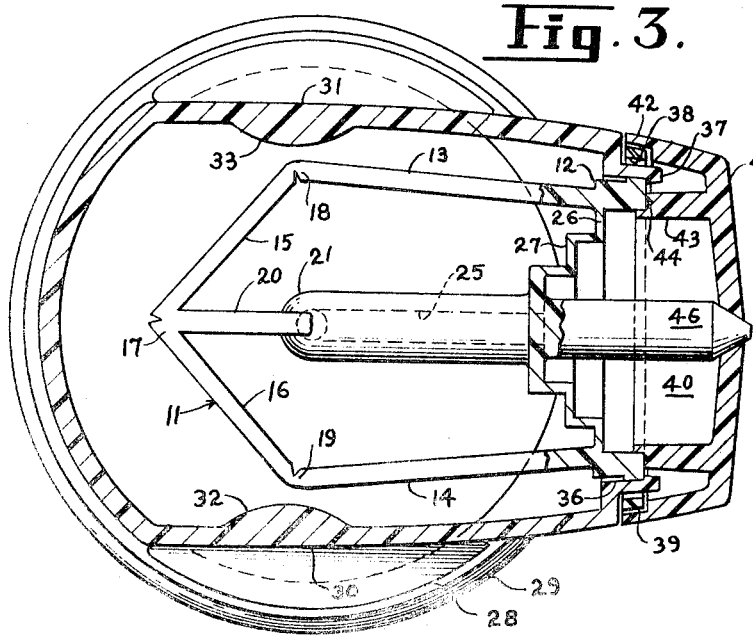
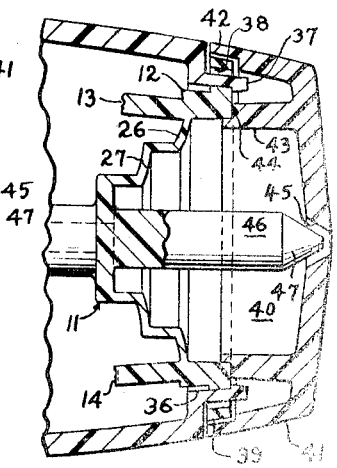
INVENTOR
Derek B. Green
BY
ATTORNEY June 2, 1970  D. B. GREEN  3,515,316
ACTUATOR FOR AEROSOL VALVES Filed Feb. 21, 1968  4 Sheets-Sheet 2

INVENTOR
Derek B. Green
BY Dallett Hoopes
ATTORNEY

June 2, 1970  D. B. GREEN  3,515,316
ACTUATOR FOR AEROSOL VALVES
Filed Feb. 21, 1968  4 Sheets-Sheet 3
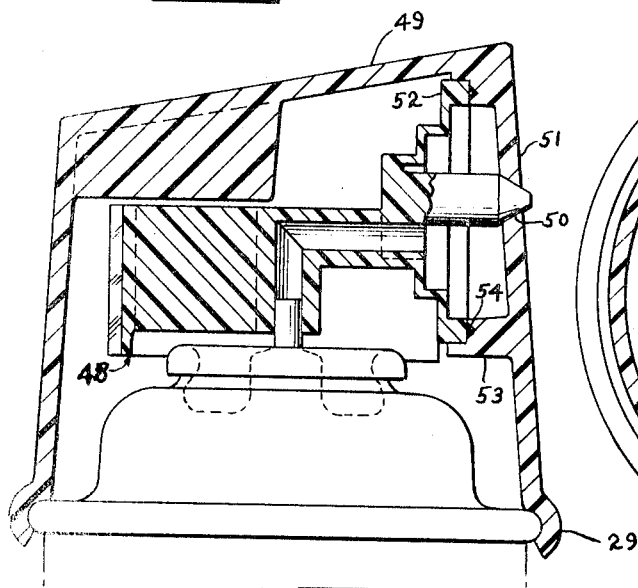
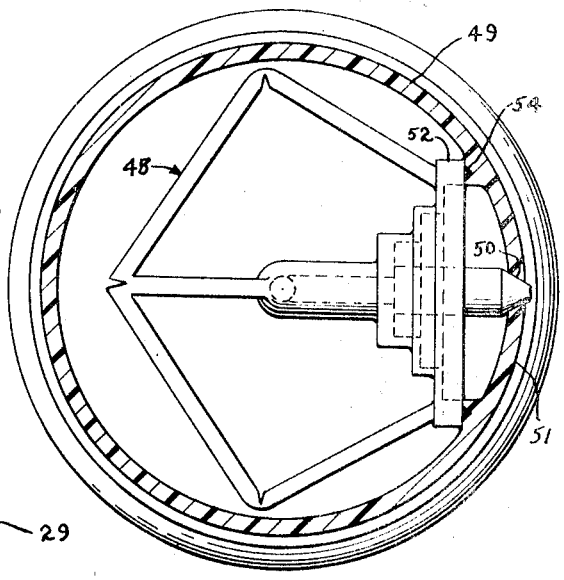
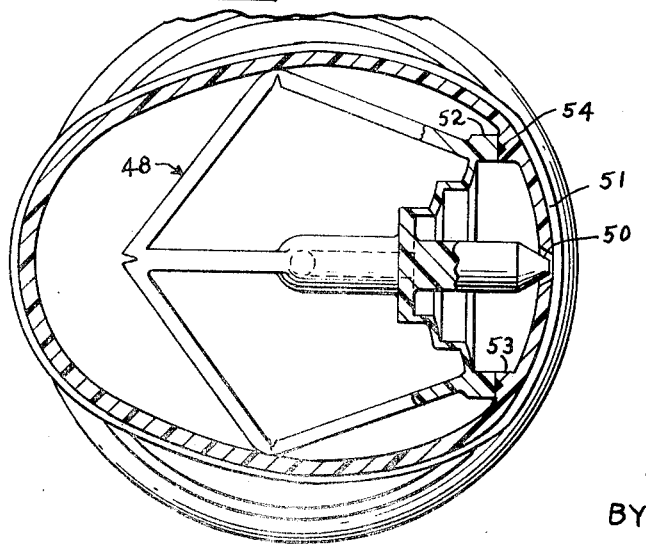
INVENTOR
Derek B. Green
BY Dallett Hoopes
ATTORNEY

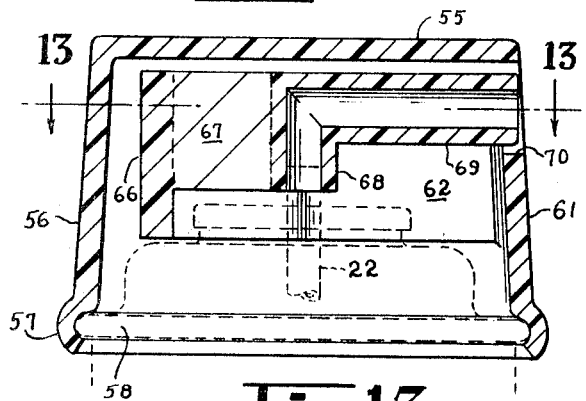
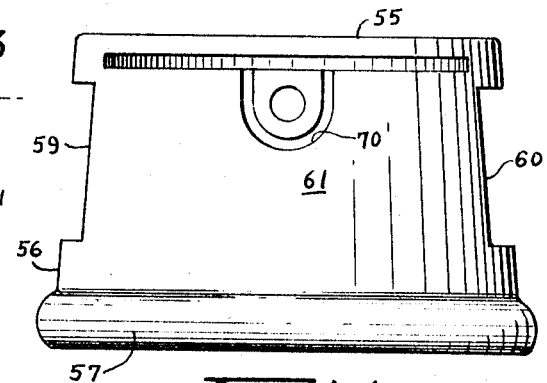
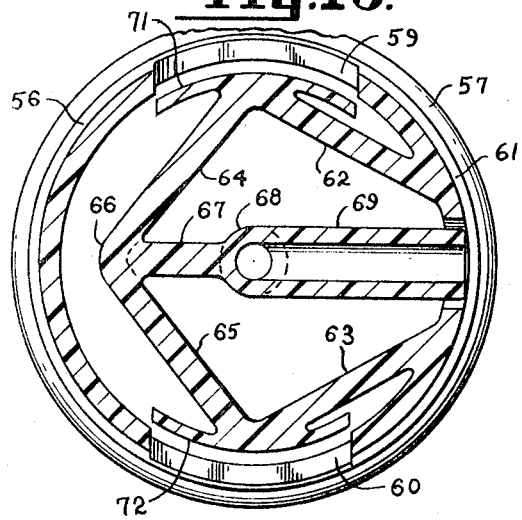
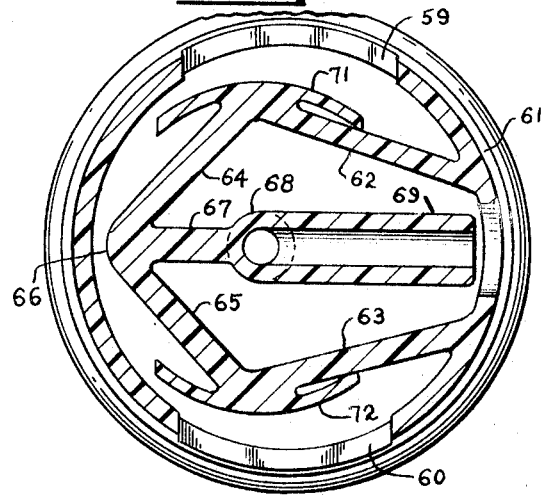
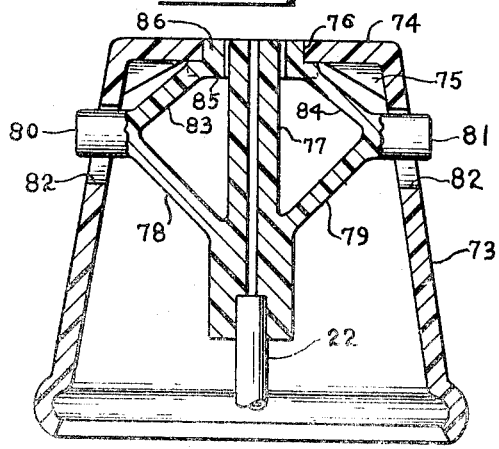
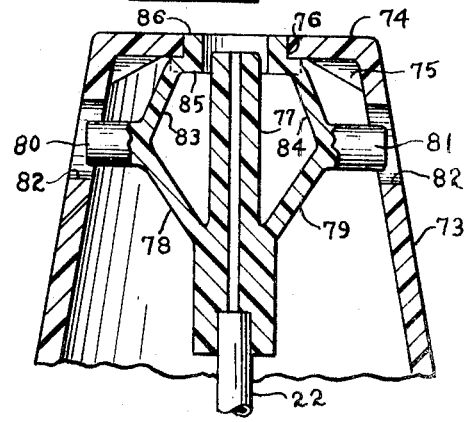
INVENTOR
Derek B. Green
BY
ATTORNEY United States Patent Office 3,515,316
Patented June 2, 1970

3,515,316
ACTUATOR FOR AEROSOL VALVES
Derek Bernard Green, Manchester, N.H., assignor to Scovill Manufacturing Company, Waterbury, Conn., a corporation of Connecticut
Filed Feb. 21, 1968, Ser. No. 707,244
Int. Cl. B65d 83/14
U.S. Cl. 222—207      11 Claims

ABSTRACT OF THE DISCLOSURE

An aerosol actuator molded in one piece has a continuous perimetrical semi-rigid resilient structure mounted on the valve stem with one section fixed to the container. When it is squeezed together by lateral pressure the structure elongates along an axis normal to the applied pressure so that a portion of the structure will move in a linear path away from such fixed section. Carried by the movable portion is a conduit fitting tightly on the valve stem and leading to a discharge passage. An overcap has flexible sides or openings through which pressure is applied to the actuator. The overcap may have an orifice in communication with the discharge passage, and a plug valve on the actuator moves automatically away from the orifice when squeeze pressure is applied to the semi-rigid resilient structure to move the valve stem for opening the valve by either a tilt action or a vertical action.

---

The invention relates to an actuator for aerosol valves which preferably is covered by an overcap to give a smooth unbroken appearance.

An object of the invention is to provide an actuator which can be used in a more convenient manner and without removing the overcap. My improved actuator has an advantage over those in general use in that it can be operated by a squeeze action of a thumb and forefinger of the hand which holds the container. This action operating preferably through flexible walls of an overcap, moves a semi-rigid resilient structure mounted around the valve stem so as to open the discharge valve.

A further object of the invention is to combine with such an improved actuator, a secondary sealing system which may consist of a plug valve formed as a part of and movable laterally with the actuator to open a discharge orifice when the main valve is open and automatically close such orifice when the actuator is released. Such a valve, closing from the inside, provides an automatic seal at the surface which resists pressure much better than devices intended to close over the outside of the orifice, such as shown in the patents to Beard 3,254,676 and Tuttle 3,146,922.

Other objects and advantages will hereinafter more fully appear.

In the accompanying drawings, I have shown for illustrative purposes four embodiments which the invention may assume in practice.

In these drawings:

FIG. 1 is a perspective view of a combined cap and actuator;

FIG. 2 is a side elevation with the working parts in section along a central line through the discharge orifice;

FIG. 3 is a horizontal view principally in section on the plane of the discharge orifice showing the position of the parts when the valve is closed;

FIG. 4 is a partial sectional view similar to FIG. 3 showing the valve in open position;

FIG. 5 is a detailed sectional view showing the manner of assembling the actuator with the overcap;

FIG. 8 is a view principally in vertical central section showing a modified form of actuator and overcap;

FIG. 9 is a horizontal section through this modified form on the plane of the discharge orifice in closed position;

FIG. 10 is a view similar to FIG. 9 showing the open position;

FIG. 11 is a central vertical section showing a second modification where the actuator and overcap are one piece;

FIG. 12 is a front elevation of the device shown in FIG. 11;

FIG. 13 is a horizontal section on line 13—13 of FIG. 11 with the parts in the closed position of the valve;

FIG. 14 is a similar horizontal section indicating the valve in open position;

FIG. 15 is a central vertical section showing a third modification in the closed position of the valve; and FIG. 16 is a view similar to FIG. 15 showing the valve in open position.

Figure 6:
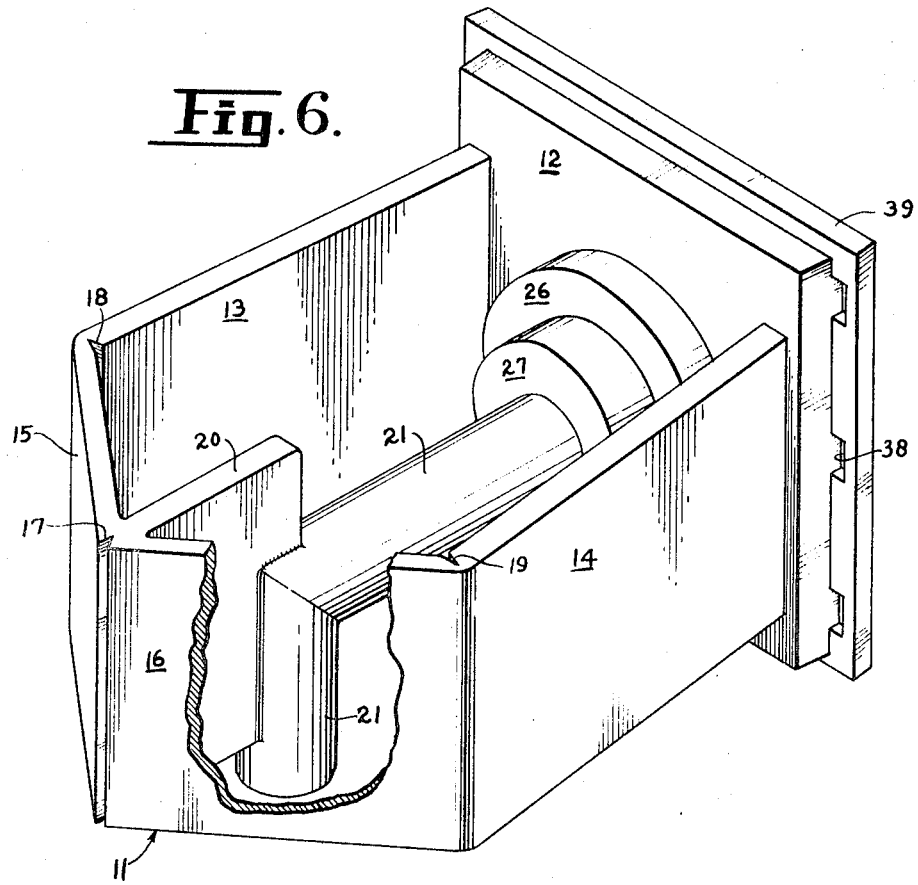
FIG. 6 is a perspective view partly broken away of the actuator shown in FIGS. 2 through 5.
Figure 7:
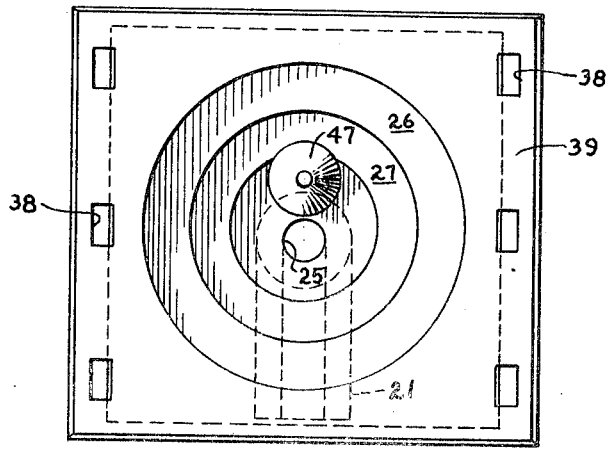
FIG. 7 is a front elevation view of the actuator.

As best seen in FIGS. 3 and 6, the actuator generally designated by the number 11, consists of one piece which may be molded from a suitable plastic material such as polyethylene, that is relatively rigid in thicker sections while being flexible in the thinner sections. The actuator has a continuous perimetrical semi-rigid flexible frame which consists of a rigid fixed section or rim 12 at one end, a pair of lateral arms 13 and 14, and a pair of angularly arranged connecting arms 15 and 16 which are joined by an externally notched hinge section 17. The lateral arms 13 and 14 are joined to the respective connecting arms 15 and 16 by the internally notched hinge sections 18 and 19. The fixed section 12 is in the form of a rigid rim which may be circular in shape, but is herein shown as being approximately square. Each of the lateral arms 13 and 14 and the connecting arms 15 and 16 are rectangular in shape to provide sufficient depth to the frame to give it vertical stability. The connecting arms 15 and 16 and especially the hinge section 17 will move radially outwardly, or to the left as shown in the drawing when the lateral arms 13 and 14 are squeezed toward each other. Extending inwardly from the hinge section 17 is a web 20 which is integral with a tubular section 21 fitting tightly over a valve stem 22. It will be understood that the stem 22 is part of a well-known aerosol valve which is actuated to open position by lateral or tilt action of the stem. The valve itself is not shown but it is housed in a cap 23 which in turn is secured to the container top 24. The tubular section 21 leads to a discharge passage 25 extending radially outwardly toward the fixed rim 12 of the structure 11, and such tubular section and discharge passage will shift to the left in a radial direction when movement is imparted to the hinge section 17. To permit this movement, the end of the discharge passage 25 is integrally joined to the fixed rim 12 through a flexible wall which may take the form of a series of steps including the comparatively thin annular portions 26 and 27.

The overcap has a generally cylindrical base 28 with an internally grooved bottom rim 29 by which it is secured to the bead 29a of an aerosol can in the usual manner. The upper portion of the overcap is shaped to provide side walls 30 and 31 which are generally rectangular in shape and almost flat so that they may easily be forced inwardly when squeezed together by the user's thumb and forefinger. These walls 30 and 31 may have vertically extending ridges 32 and 33 adapted to engage the corners or hinge sections 18 and 19 to transmit pressure to the flexible frame 11. The top wall 34 of the overcap may be provided with a depending flange 35 in line with the web 20, to obviate any tendency for the frame 11 to move upwardly to any appreciable extent, and to enable pressure to be exerted on the frame 11 to force the tubular portion 21 over the valve stem 22.

The overcap is molded with an opening 36 shaped to fit around the rigid frame section 12. The actuator in the form of the invention shown in FIGS. 1 to 5, is assembled through this opening and as seen in detail in FIG. 5, hook-like projections 37 on the overcap pass through holes 38 in a flange 39 on the actuator and snap into place over the outer face of the rim section 12.

The discharge passage 25 opens at its outer end into a chamber or housing 40 formed by a stationary cap 41 having a flange 42, made flush with the outer surface of the overcap, and a cylindrical wall 43 adapted to be fixed in any suitable manner to the outer face of the actuator rim section 12, as by cementing or welding indicated at 44.

The cap 41 has a tapered discharge orifice 45 as best seen in FIG. 4. A plug valve 46 is molded integrally with the actuator frame to extend from one side of the discharge passage 25 and the tapered end 47 of this valve normally closes the discharge orifice 45. However when squeeze pressure is applied to the frame, this secondary sealing means opens simultaneously with the opening of the main aerosol valve. When such pressure is released, there is an automatic cut-off at the surface and with the valve arranged inside the chamber 40, the pressure of material will not tend to open the valve allowing material to continue to ooze out, as in other attempts to valve-off the discharge orifice.

In the alternative form shown in FIGS. 8, 9 and 10, the semi-rigid frame 48 is shaped somewhat differently but operates in the same way when lateral pressure is applied to the cylindrical overcap 49. Instead of the additional cap 41, the orifice 50 is formed directly in a front wall 51 of the overcap, and in this case, assembly of the actuator must be made through the bottom of the overcap. The rigid rim 52 of the actuator is cemented or welded to an internal boss 53 as indicated at 54. The operation in other respects is similar to that described above in connection with the first form of the invention.

In another form of the invention as seen in FIGS. 11 to 14, the overcap and actuator are molded as one piece. This combination has all of the advantages of squeeze action manipulation, and is relatively cheap to manufacture. This type of overcap actuator may be employed in cases where it is not important to valve-off the dispensing orifice. The overcap is in the general shape of an inverted cup having a top wall 55, cylindrical side wall 56, and a bottom rim 57 adapted to engage over the bead 58 of an aerosol container. On opposite sides of the cylindrical wall are access openings 59 and 60.

Joined to the front portion 61 of the cylindrical wall 56 are arms 62 and 63 of the semi-rigid perimetrical frame which correspond to the arms 13 and 14 of FIGS 2 and 3. Hinged to these arms are the connecting arms 64 and 65 which in turn are connected by a hinge section 66. Extending inwardly from the hinge section 66 is a web 67 which joins with a tubular portion 68 fitted over the valve stem 22. The tubular portion 68 leads to a discharge passage in the form of a horizontal tubular section 69 which extends into a window or opening 70 in the front wall 61 of the cap. Pressure pads 71 and 72 may be molded on the actuator in the corner sections in line with the access openings 59 and 60. When pressure is applied in the manner seen in FIG. 14 to these pads 70 and 71, the frame will elongate, forcing the hinge section 66, web 67 and discharge passage 68 and 69 to the left as seen in the drawings. This will move the valve stem and cause the opening of a common form of tilt action valve.

In the modification shown in FIGS. 15 and 16, the overcap is preferably molded as a piece separate from the actuator. It may have a conical wall 73 with a bottom rim for engaging an aerosol can, and a top wall 74 which is preferably made rigid by internal corner webs 75, and this top wall has an opening 76 to accommodate a discharge tube 77. This tube has an enlarged bottom bore to fit around the valve stem 22. The perimetrical frame in this case is arranged vertically to adapt it for a vertical action type valve. It has the two arms 78 and 79 joined to the lower portion of the discharge tube 77. Such arms join with operating pads or buttons 80 and 81 which extend through lateral openings 82 in the wall 73 of the cap. Other arms 83 and 84 extend from the buttons 80 and 81 respectively to a rim 85 which may have a reduced portion 86 extending into the hole 76 in the top wall 74 of the cap, and, in this case, the discharge tube 77 extends through a hole in this rim 85.

It will thus be seen that the upper portion of the flexible frame is maintained stationary by the upper wall 74 of the cap, and when squeeze pressure is applied to the buttons 80 and 81 as seen in FIG. 16, the frame will elongate vertically and depress the valve stem 22 to open a vertically acting valve.

What I claim is:

1. An actuator for an aerosol valve of the type having a valve stem projecting from an aerosol container, comprising a substantially continuous perimetrical semi-rigid resilient frame, one portion of said frame being fixed with respect to such container while an opposing portion is movable away from said fixed portion due to elongation of said frame by squeeze pressure applied to the sides of said frame between said fixed and movable portions, and means for connecting said movable portion to such valve stem for actuating such valve stem to open such aerosol valve.

2. An actuator for an aerosol valve comprising a tubular section adapted for fitting on a valve stem, a laterally extending discharge passage leading from said tubular section, a substantially continuous perimetrical semi-rigid resilient frame surrounding said tubular section, one portion of said frame being fixed while an opposing portion is movable radially outwardly by squeeze pressure applied to the sides of said frame between said fixed and radially movable portions, and means for connecting said radially movable portion to said tubular section for actuating said valve stem laterally to open the aerosol valve.

3. An actuator for aerosol valves as defined in claim 2 in combination with fixed means providing a housing around the outlet end of said discharge passage, said housing having a discharge orifice, and a shut-off valve connected to said radially movable portion normally closing said orifice and movable inwardly of said housing away from said orifice when squeeze pressure is applied to said actuator to open the aerosol valve.

4. An actuator for aerosol valves as defined in claim 2 wherein said perimetrical frame has a rigid fixed section at one end, a pair of lateral arms, and a pair of connecting arms at the opposite end, said connecting arms being flexibly joined by hinge sections to said lateral arms.

5. An actuator for aerosol valves as defined in claim 4 wherein said discharge passage at its outer end is joined to said fixed section through a series of steps including at least one flexible wall portion.

6. An actuator for aerosol valves as defined in claim 2 in combination with an overcap adapted to be secured to an aerosol container and completely covering said actuator, means carried by said overcap providing a discharge orifice adapted for communication with said discharge passage, and a valve carried by said actuator normally closing said orifice but movable automatically to open said orifice when squeeze pressure is applied to said actuator to open the aerosol valve.

7. An actuator for aerosol valves as defined in claim 1 in combination with an overcap enclosing said actuator, said overcap having opposed flexible side walls adjacent the movable sides of said frame so that squeeze pressure may be applied to the frame through said flexible walls.

8. In combination with an actuator as defined in claim 1, an overcap which substantially covers said actuator, said overcap having means for securing it to the container, said fixed portion of said frame being attached to said overcap.

9. The combination according to claim 8 further characterized by the fact that said overcap is integrally joined to said actuator.

10. In combination with an overcap having means for securing it to a container; an actuator in accordance with claim 1 wherein the perimetrical frame extends vertically and is adapted for vertical action, the upper portion of said frame being held by said cap while the lower opposite vertically movable portion is connected to said valve stem.

11. For an aerosol container of the type having a central upstanding valve stem operable by a lateral movement, an overcap and actuator comprising
  (a) a housing fixed to such container and having an orifice directed horizontally;
  (b) a resilient wall interposed between the housing and the stem, the wall covering the orifice and having its periphery fixed to the housing;
  (c) a rigid plug fixed to a center portion of the resilient wall and extending horizontally, its end normally blocking the orifice;
  (d) a rigid conduit extending between such stem and the resilient wall near its center; and
  (e) valve actuating means for urging, upon pressure against it, such stem away from the housing to thereby open such valve and draw the plug away from the orifice permitting discharge.

References Cited
UNITED STATES PATENTS

| | | | |
|---|---|---|---|
| 2,697,635 | 12/1954 | Ivins et al. | 222—213 X |
| 3,141,580 | 7/1964 | Rogers | 222—213 |
| 3,272,392 | 9/1966 | Meshberg | 222—509 X |
| 3,323,690 | 6/1967 | Monahon | 222—509 X |
| 3,404,814 | 10/1968 | Wakeman | 222—213 X |
| 3,361,301 | 1/1968 | Meshberg | 222—402.12 X |

ROBERT B. REEVES, Primary Examiner

F. R. HANDREN, Assistant Examiner

U.S. Cl. X.R.

222—213, 402.12, 402.21, 505